United States Patent
Hejny et al.

(10) Patent No.: US 10,482,553 B2
(45) Date of Patent: Nov. 19, 2019

(54) GEOGRAPHIC INFORMATION MANAGEMENT SYSTEMS AND METHODS

(71) Applicant: PLM, LLC, Fort Worth, TX (US)

(72) Inventors: Jesse Hejny, Forth Worth, TX (US);
Bryan Cortney, Forth Worth, TX (US);
Adrian Macias, Fort Worth, TX (US);
Arthur Medina, Houston, TX (US);
Ryan Barnhart, Forth Worth, TX (US);
Nathan McIntyre, Akron, OH (US)

(73) Assignee: PLM, LLC, Dallas, TX (US)

( * ) Notice: Subject to any disclaimer, the term of this patent is extended or adjusted under 35 U.S.C. 154(b) by 835 days.

(21) Appl. No.: 14/941,363

(22) Filed: Nov. 13, 2015

(65) Prior Publication Data
US 2016/0140677 A1    May 19, 2016

Related U.S. Application Data

(60) Provisional application No. 62/079,362, filed on Nov. 13, 2014.

(51) Int. Cl.
*G06Q 40/00* (2012.01)
*G06Q 50/16* (2012.01)
(Continued)

(52) U.S. Cl.
CPC ......... *G06Q 50/163* (2013.01); *G06Q 20/085* (2013.01); *G06Q 20/102* (2013.01);
(Continued)

(58) Field of Classification Search
CPC .............. G06Q 50/163; G06Q 30/0645; G06F 17/30241
See application file for complete search history.

(56) References Cited

U.S. PATENT DOCUMENTS

| | | | |
|---|---|---|---|
| 6,658,460 B1* | 12/2003 | Streetman | G06Q 10/063 709/217 |
| 7,676,420 B1* | 3/2010 | Agnew | G06Q 40/00 138/139 |

(Continued)

FOREIGN PATENT DOCUMENTS

WO    WO-2010009310 A1 *  1/2010  ............. G01V 11/00

OTHER PUBLICATIONS

"Division Order Analyst," published Feb. 14, 2015 at www.iLandMan.com/exploration-and-production, as evidenced by https://web.archive.org (Year: 2015).*

(Continued)

*Primary Examiner* — Abhishek Vyas
*Assistant Examiner* — William B. Bunker
(74) *Attorney, Agent, or Firm* — Slater Matsil, LLP

(57) ABSTRACT

An embodiment method for managing geographic information includes receiving, at a service portal, executed lease data for mineral rights leases on associated first land parcels, generating first map data according to the executed lease data, and sending the first map data through a network interface to a client application for display to a first user at a first remote terminal. The method further includes receiving, from the first remote terminal, data for a proposed division order boundary, determining one or more of the first land parcels having boundaries that at least partly overlap the proposed division order boundary, generating division order data related to portions of the one or more first land parcels, and sending the division order data to the first remote terminal for display to the user.

20 Claims, 6 Drawing Sheets

(51) Int. Cl.
*G06Q 30/06* (2012.01)
*G06Q 20/10* (2012.01)
*G06Q 30/04* (2012.01)
*G06Q 20/08* (2012.01)
*G06Q 20/12* (2012.01)

(52) U.S. Cl.
CPC ............. *G06Q 20/12* (2013.01); *G06Q 30/04* (2013.01); *G06Q 30/0645* (2013.01)

(56) References Cited

U.S. PATENT DOCUMENTS

| | | | |
|---|---|---|---|
| 8,209,265 B1* | 6/2012 | Agnew | G06Q 50/16 705/311 |
| 8,249,994 B2 | 8/2012 | Sinclair et al. | |
| 2007/0226004 A1* | 9/2007 | Harrison | G06Q 10/00 705/26.1 |
| 2008/0249790 A1* | 10/2008 | Sinclair | G06Q 10/10 705/1.1 |
| 2015/0109316 A1* | 4/2015 | Burgin | G06T 11/60 345/581 |
| 2015/0228025 A1* | 8/2015 | Allison | G06Q 40/06 705/36 R |

OTHER PUBLICATIONS

ILandman—Innovative Landman Solutions, www.iLandman.com,—"Creating a Division Order with iLandman," posted on www.youtube.com on Nov. 6, 2015. (Year: 2015).*

Lucas LaVoy and Rebecca Seidl, "Unitization and Pooling," Association of Lease and Title Analysts (Apr. 22, 2013) (Year: 2013).*

Donna Reeves, Sarah Broyles, Luanne Johnson, Marvin L Wigley, Linda Barry, "Section II: Division Order Creation and Maintenance" (2007) (Year: 2007).*

ILandman Innovative Landman Solutions, retrieved online at www.ilandman.com on Nov. 13, 2015, 7 pages.

* cited by examiner

GEOGRAPHIC INFORMATION MANAGEMENT SYSTEMS AND METHODS

This application claims the benefit of U.S. Provisional Application No. 62/079,362, filed on Nov. 13, 2014, which application is hereby incorporated herein by reference.

TECHNICAL FIELD

The present invention relates generally to a system and method for handling mineral rights information, and, in particular embodiments, to a system and method for providing real time mapping based on mineral rights ownership and lease information and generating plots and data for division orders based on user interaction with the real time map.

BACKGROUND

Currently there are thousands of individuals researching real property records across the country. The process of researching real property records is very archaic by nature. Typically an individual must conduct research within a public courthouse in an attempt to chain property conveyances from one party to another. Conveyances are historically kept in the form of paper and organized within hard bound books. As property is conveyed, public officials document the transaction outlining the property (or lands) being transferred along with addendums relative to the transaction.

An individual performing services will compile a chronological list of documents that all historically coincide with a tract of land, or real property. Once the individual completes his/her work, they have completed a chain of title for a given tract of land. To make for a more streamlined operation for the client or party requesting the services, the individual takes the list of documents and inputs information from each document into a template approved by the client. Depending on the scope of work, various portions of the documented conveyances and/or reddendum(s) listed within the document can be critical or irrelevant. Once complete, the individual should have all physical documents and a summary of those documents in the template, also known as a runsheet. That runsheet is then delivered, with the documents, to the client as a finished product.

There is no standard method used to construct a runsheet of a chain of title. With no industry standard, there are several chances to introduce careless error that could be easily avoided. Because of this, there is an inevitable quest to create a standardized method of electronically documenting and/or databasing this process in a way to create uniformity, thus simplifying the process.

SUMMARY

An embodiment system includes a network interface, a processor connected to the network interface and a non-transitory computer readable medium connected to the processor. The non-transitory computer readable medium has stored thereon instructions that, when executed, cause the processor to receive executed lease data for mineral rights leases on associated first land parcels, generate first map data according to the executed lease data, and send the first map data through the network interface to a client application for display to a first user at a first remote terminal. The non-transitory computer readable medium further has stored thereon instructions that cause the processor to receive, from the first remote terminal, data for a proposed division order boundary, determine one or more of the first land parcels having boundaries that at least partly overlap the proposed division order boundary, generate division order data related to portions of the one or more first land parcels, and send the division order data to the first remote terminal for display to the first user.

A method according to an embodiment includes receiving, at a service portal, executed lease data for mineral rights leases on associated first land parcels, generating first map data according to the executed lease data, and sending the first map data through a network interface to a client application for display to a first user at a first remote terminal. The method further includes receiving, from the first remote terminal, data for a proposed division order boundary, determining one or more of the first land parcels having boundaries that at least partly overlap the proposed division order boundary, generating division order data related to portions of the one or more first land parcels, and sending the division order data to the first remote terminal for display to the user.

An embodiment method includes receiving, at a first remote terminal and from a server, first map data generated at the server according to executed lease data, displaying, in an interface on the first remote terminal, a map that includes parcel boundaries according to the first map data and that are overlaid on a geographic map, and receiving, at the first remote terminal, a first input from a user indicating a proposed division order boundary in the interface. The method further includes sending, from the first remote terminal to the server, data associated with the proposed division order boundary, receiving, at the first terminal and from the server, division order data associated with one or more land parcels having boundaries that at least partly overlap the proposed division order boundary, and displaying the division order data in the interface.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
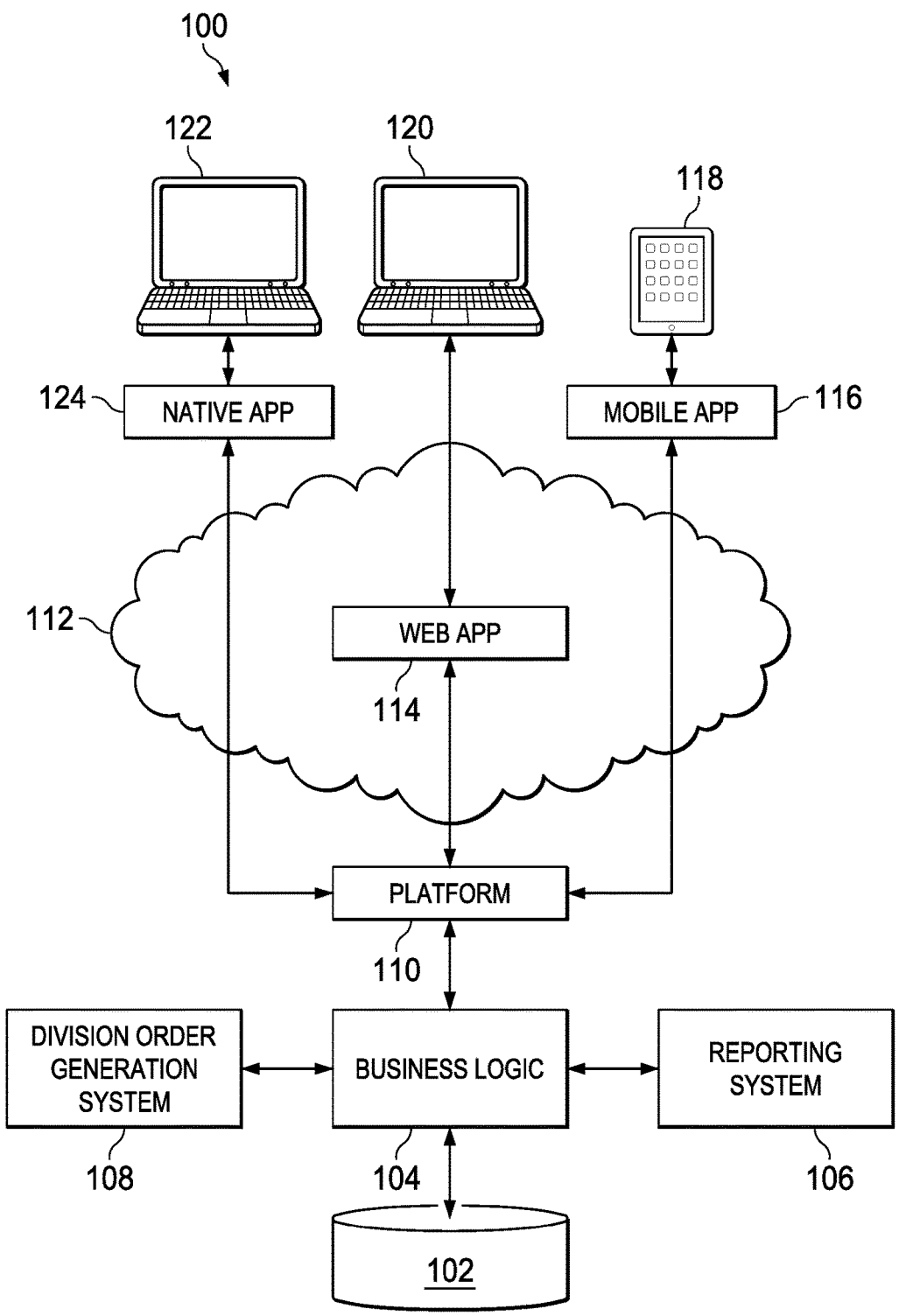
FIG. 1 is a diagram illustrating a system for collecting rights information and providing a real time rights map for user interaction according to some embodiments.

The making and using of the presented embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Mineral exploration and extraction, such as drilling for, or pumping, oil or natural gas, requires significant preparation before beginning field operations. Before the development of any minerals by drilling a well may occur, the rights to extract those minerals from below the surface must be acquired from the rights holders. In many cases an owner of a particular parcel of land has split the ownership of the surface rights from the ownership of the subsurface mineral rights. Mineral extraction operators generally need to acquire leases for the right to extract minerals in a plot from a rights owner or another operator.

Mineral extraction is frequently done according to divisions, which are contiguous geographic regions that are defined for one or more wells. The divisions permit the operator to manage the royalties and expenses for multiple leases making up division as a group. Wells can span multiple leases, extending through, or drawing minerals from, multiple parcels, each owned by different rights holders. A division order is an agreement with each lessor and operator involved in a division regarding their royalty ownership or obligation in the overall division. The division orders are used as a final agreement before drilling wells or beginning extraction operations, but generally do not modify the terms of the leases.

In many instances, leases are executed with rights holders before divisions are identified. A lease will generally contain a number of contractual clauses that will restrict or allow certain activities with the mineral estate and in some cases require that certain monetary payments be made in exchange for certain rights and state deadlines for payment. The leases are then analyzed to determine that all of the necessary rights have been acquired, and that all relevant parties have been identified. Afterwards, a title opinion is rendered and a division order is drawn up.

The sheer number of parties involved in identifying rights holders, negotiating leases, surveying parcels, verifying deeds, rendering title opinions and managing obligations has generally required that all of the paperwork be received before drawing up a division order. Additionally, the parcels where leases are needed currently cannot be identified accurately while the leases are being processed.

It has been determined that an automated system that uses a real time mapping system showing lease parcels and related information provides information to operators more efficiently than past systems. Additionally, such a real time mapping system can permit a user to draw proposed divisions, in real time, so that the leases and relevant obligations for a proposed division can be analyzed before formalizing the division. This permits an operator to identify a division layout or boundary that includes objectionable or inefficient leases. The operator can adjust or move division boundaries to improve the economic and production efficiencies of divisions. It should be understood that references to mapping in real time are not limited instantaneous mapping or updating, but are intended to include near real time mapping, or updating a map with any new data on a regular basis or at regularly specified intervals such as 5 or 10 minutes, or less.

The presented system is uniquely created to organize, document and standardize conveyances of real property. In its simplest form, the system allows the user to walk through the process of documenting such conveyances within a graphical user interface, and run tests to ensure quality and accuracy. The process begins with the user importing an electronic version of the conveyance found on record into the database. Once the conveyance is in the system, the user is then prompted with a GUI that walks him/her through each user-defined feature(s) important to the scope of work. In some embodiments, as the user inputs information into the GUI, a link is made either manually (by user) and/or automatically (by auto-recognition) between the information inputted, and the physical location(s) within the electronic document where the information is found. Once the user completes all required feature(s), the information is run through a set of predefined tests that the user has created. The tests are designed to eliminate the basic infractions created by the user, while automatically tagging user-defined occurrences for future review. The verified information can then be displayed in a real time mapping system for use in generating division orders using live or real time data as it is entered. Such a system permits the analysis and viewing of lease or conveyance data as it is entered, avoiding a requirement that each stage of the process or paperwork be completed prior to beginning subsequent steps. Thus, for example, title review and opinion work may be begun on collected ownership data while other ownership data is still being gathered. Similarly, the real time mapping system may show regions where lease rights have or have not been acquired, permitting a user to draw a proposed division order that avoids parcels where leases or rights have not been conveyed.

FIG. 1 is a diagram illustrating a system 100 for collecting rights information and providing a real time rights map for user interaction according to some embodiments. The system has a database 102 for storing documents, lease information, deed information, information on contact or negotiations with rights holders, division information, and the like. In some embodiments, the database 102 is a relational database such as a structured query language (SQL) database, but can also be a flat file, a non-relational database, or the like, and may be an executable, process, virtual program or other computer executable instruction. In some embodiments, the database 102 is deployed on one or more servers, or is one or more processes running in a virtualized environment such as a cloud server.

The system 100 further has business logic 104 that is, in some embodiments, one or more software modules, executables, or other executable code that receives communications from remote terminals or modules requesting data from, or sending data to, the database. In some embodiments, the business logic 104 may be configured to gather data from the database 102 and generate reports, payment decks, maps, lease packages, division order paperwork packages, or the like, from data in the database 102. Additionally, the business logic 104 may enforce rules on data coming into the database 102, for example, by checking the data to ensure that inputs from various modules meet with business rules or the like before the data is saved to the database 102. In some embodiments, the business logic 104 provides user login management and security for applications connecting to the business logic by, for example, authenticating users and maintaining user sessions.

In some embodiments, the system 100 has a reporting system 106 and a division order generation system 108 connected to the business logic 104. The reporting system 106 permits users to access or view reports based on data retrieved through the business logic 104. In some embodiments, the reporting system 106 generates the reports, and in other embodiments, the reports are requested from the business logic 104, which generates the reports.

The division order generation system 108 calculates information related to proposed divisions. Information related to a proposed division or division order, such as division order boundaries, is sent to the business logic 104, which retrieves lease information relevant to the proposed division order from the database 102. Calculations can be summarized based on a division, a lease boundary, or by a single or combination of various mineral tracts that may or may not become a unit at a later date.

The system 100 has a platform 110 connected to the business logic 104. The platform 110 has one or more modules or subsystems that provide specific functionality to remote users. In some embodiments, the modules are packages, executables, servlets, procedures, components, or the like, that can be standalone executables, run in processes under the control of a platform manager, or in any other format.

The remote users may be connected through a remote terminal to the platform 110 by a network 112 such as the internet, an intranet, local network, or the like. Additionally, the network 112 may have one or more wireless portions, such as a WiFi, cellular, WiMax, satellite, or other wireless elements. A native application 124 may be provided by the system 100 and may be disposed on a remote computer 122 such as a desktop, laptop or other computing platform that can run a applications natively. In some embodiments, the native application 124 is an executable compiled to run, for example, in a Java™, Windows™, OS X™, Linux or other computing environment.

In some embodiments, the system 100 may have a mobile application 116 that is disposed on a mobile computing platform 118 such as a smartphone, tablet or the like. Each of the native application 124 or mobile application 116 may be a thin-client, and pass input from a user to the platform 110 with little or no processing being performed within the respective application. In other embodiments, the native application 124 or mobile application 116 may be a rich client application that processes input from the user or data returned from the platform 110 to implement rules or logic for processing the data.

In some embodiments, the platform 110 also provides a web application 114 that comprises components that are run in a web browser or the like of a remote device 120. The web application 114 may act as a thin client, passing input from the user to the platform 110, or passing data from the platform to a user, with little processing.

The platform 110 provides one or more modules or sub-systems with different functionalities as described in greater detail below. The platform 110 links the applications, 124, 114 and 116 to the business logic 104, or in some embodiments, is integrated into the business logic 104.

The platform 110 provides portals for receiving research documents such as deeds, surveys, rights holder information, lease information and the like. Additionally, the platform 110 includes portals for generating and providing documents, and the like, related to leases, division orders, and other related mineral recovery elements to users. For example, ownership information such as document type, book, page, instrument date, recordation date, grantor, grantee, acreage, legal description, conveyance notes or abstractor comments may be entered as part of parcel ownership or rights conveyance research.

The platform 110 also includes a real time map generation system that displays maps and lease information from the database and permits a user to define a proposed division order and displays the statistics or parameters for the division order calculated by the division order generation system 108.

Figure 2:
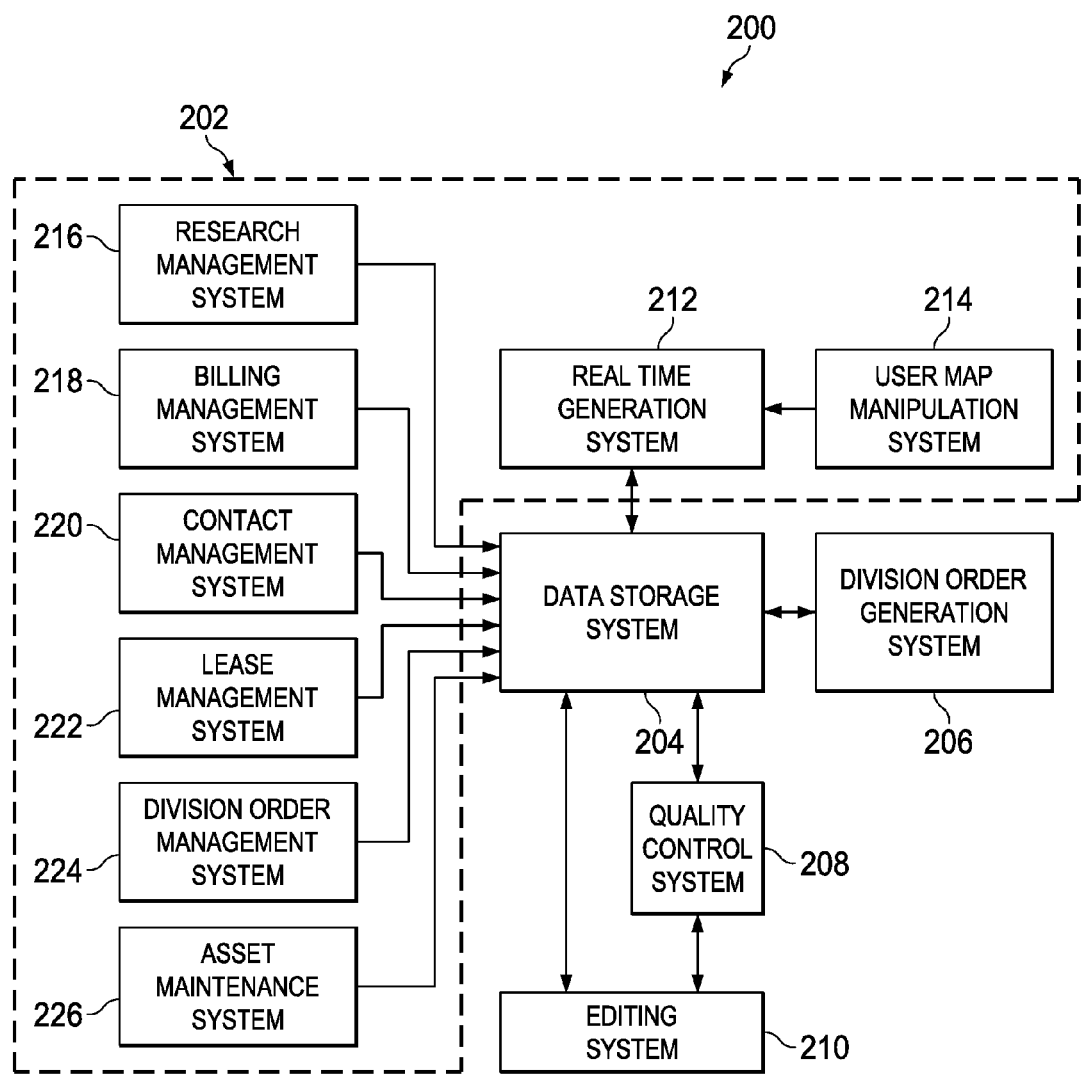
FIG. 2 is a diagram illustrating modules of the system for collecting rights information and providing a real time rights map for user interaction according to some embodiments

FIG. 2 is a diagram illustrating modules of the system 200 for collecting rights information and providing a real time rights map for user interaction according to some embodiments. The system 200 has a data storage system 204 that, in some embodiments, includes a database, and may also include the reporting system for retrieving and formatting data from the database. The system 200 has a platform 202 that communicates with the data storage system 204 and that has modules providing functionality to end users.

The platform 202 includes a research management system 216 that includes, for example, a land ownership data management portal that provides for entering and managing landowner or rights holder data. Field landmen or attorneys enter all title research to build a data set of title information, including surface and mineral estates, contact information for landowners, and the like. Additionally, the research management system 216 may include a validation or quality check on entered data. For example, the research management system 216 may check incoming research documents or data for rule infractions such as the current grantor not equaling the previous grantee, the current grantee not equaling a future grantor, previous acreage not equaling current acreage, current legal description (such as county, township or borough) not equaling previous legal description or the, current reservation not equaling previous reservation. Entries that violate the validation or quality check may be denied, or may be flagged for additional research or correction. Additionally, the research management system 216 may require that certain conditions be met for entered data or documents. For example, the research management system 216 may have a requirement regarding the length of title search. (10 year, from 1950, from 1850, etc.), that the documents must include a patent reference, that the abstract must begin with a general warranty deed, a requirement that a conveyance include coal, easements or liens, that vesting document not contain reservation language and should commence with prior deed, or that the documents not include Judgments prior to 1945 or only include judgments for previous 30 years.

Attorneys who render title opinions can input ownership and curative data through the research management system 216. In some embodiments, the land ownership data includes boundary definitions for the surface or mineral estates. In some embodiments, the boundary information may be pulled from tax data such as courthouse or online records from tax assessors, title companies, title records, or the like, and additional land ownership data, such as owner name or contact information, may be entered separately as it is found or verified.

In some embodiments, the platform 202 also includes a billing management system 218. Vendors associated with a project can enter billing and cost invoices through the billing management system 218, which automatically allocates costs by the geographic location and allow for reports to be run on expenses by geographic location. The billing management system 218 contains tools that have oil and gas specific data fields and provides tracking of costs that can be shared with any partners in the development of a given region. Additionally, vendors such as seismic companies, surveyors environmental personnel, regulatory personnel, construction vendors, trucking companies, water providers, and the like, can enter invoices or summaries of their costs. The vendor data is submitted through the billing management system 218, where it is allocated to a particular project and saved in the database for display or use in calculation of division orders and related payment decks indicating the obligations and costs associated with divisions, projects or geographic regions. In some cases, multiple competing companies may perform similar work types and enter billing information into billing management system. The platform can generate reports comparing costs between any such competing companies.

In some embodiments, the platform 202 also includes a contact management system 220, which provides a portal for maintaining and sharing customer contact information for contact relations management. The land ownership data, as well as publicly available information, is used to populate a data set of landowners in a given project area. System users who contact landowners or rights holders for things such as obtaining mineral rights leases, contracts, rights-of-way, affidavits, releases or other documents may enter notes into the contact managements system 220 discussing communication or negotiations with the landowners or rights holders. The contact management system 220 tracks costs such as bonuses, delay rentals, royalty percentages, considerations for contracts, and the like, by geographic tract. In some embodiments, the contact management system tracks the geographic tracts using a tax parcel identification number issued by a local tax authority, and in other embodiments, may also use a standardized identifier to avoid nonstandard identification formats or duplicate tax identification numbers. Thus, multiple, users or departments may see a running history of notes and negotiations for contacts made with a given landowner. Field landmen, company or in-house landmen, midstream negotiators, attorneys, surface negotiators, lease analysts, and the like may have access to all, or a portion of, the contact notes to ensure accurate reporting of obligations and streamline the flow of landowner contact and negotiation. Any applicable data set may be exported into a spreadsheet or other report type.

In some embodiments, the contact management system 220 generates lease documents according to leasing rules and provides reporting and tracking for executed leases. The lease management system 222 generates leases, contracts, agreements and other related forms to ensure uniform agreements are signed by landowners. Landmen who pursue leases enter data into a submission form and select one of a predetermined group of options for various leasing terms, contract provisions, dollar amounts and the like while entering contact information. Thus, the terms of proposed agreements may be entered into the contact management system 220 during negotiation, and the options for the contract terms may be limited to prevent the entry of terms that are objectionable to the operator. In some embodiments, the acceptable options for the provisions or terms are entered by a system administrator. Additionally, standard forms and preapproved contract clauses may be entered and used as the basis for the generated contracts, leases, agreements or the like. The contact management system 220 maintains a log of documents requested and includes a timestamp showing the user requesting the documents and the time the documents were requested. After the agreement terms are acceptable to the parties, the contact management system 220 generates document packages with necessary documentation, including, for example, leases, W-9 forms, memorandum of the lease or agreement for recording purposes, contracts, agreements, exhibits and the like. In some embodiments the document packages are generated using the standard forms and populated with the data entered into the contact management system including the terms of the agreement, names of the landowner or rights holder, identification information of the parcel (such as boundaries and tax identification information), deadlines and other obligations, or any other related information. The documents package may then be emailed to the requestor or to a designated party. As the log is automatically generated, it isolates certain contractual provisions to build a schedule of obligations in real time while also connecting these data points to the mapping application so that they can be viewed by data set.

The platform 202 provides a lease management system 222 that tracks and provides reports on obligations and costs under executed leases. Once a lease or other agreement is executed, the system 200 creates a log that tracks obligations under the lease. A calendar reminder system is started and time based reports (for example, reports on obligations falling within a date range) can be generated that summarize obligations of contracts as well as terms within agreements by division, geographic region, parcel, oil and gas unit, business unit or other group. An end user can generate a report of outstanding payment obligations and track payments made within the system to ensure a contract stays in good standing under the terms of the particular agreement. An end user may also be able to run reports to see what agreements in a geographical area contain particular clauses or were paid over, or under, a certain royalty or bonus amount. Thus, a user can find comparable leases and parcels when negotiating or analyzing new leases.

The platform 202 provides a division order management system 224 that permits allocation, management and tracking of costs and revenues, and permits tracking and management of leases by division. After a well or unit area is defined, permitted, proposed or finalized, a division order is generated. The division (also called a division of interest) is used as a grouping for managing the leases within the geographic region defined by the division and summarizes the ownership in the lease or unit being drilled. As ownership is certified, typically by an attorney's opinion having ownership summaries that are entered through the research management system 216, the system 200 associates the relevant landowner and lease information with the division. The system 200 creates joint interest billing and revenue decks for the division according to parameters of the division order and the associated landowner and lease data. The billing and revenue decks list the obligations and expenses related to the division so that payments can be determined and tracked and also list the landowners, rights holders or business entities that have an interest in the division such as a working, non-operating working, royalty, overriding royalty interest, or the like.

The platform 202 also provides an asset maintenance system 226 that manages royalties and mineral interests for end users that are not operating, or not actually drilling the well in a particular division. The asset maintenance system 226 tracks, organizes and shows summaries of interests, including mineral interests, royalty interests, non-participating royalty interests, or the like. Thus, a company that has leases falling within a division, but that is not performing actual mineral extraction, may manage its assets in the division by tracking payments and obligations due the user.

The platform 202 also provides a real time map generation system 212 and user map manipulation system 214. The real time map generation system 212 provides a map showing land features and overlays parcel and division boundary information over the displayed land features. Thus, the display may include roads, cities, topographic features, rivers, lakes, and the like, in combination with tract or parcel boundaries and ownership information. The map generation system 212 pulls map data for displaying the land features from a map source, such as publicly available map information, from a third party provider, from information within the data storage system 204 or the like. The boundary information entered through the research management system 216 may be displayed over the land feature display and additional information related to each parcel maybe displayed with the boundary information.

The user map manipulation system 214 permits a user to interact with the map by, for example, zooming in or out, dragging the map to view different regions, and drawing proposed divisions on the map, in real time, so that the costs, royalties, rights ownership, and the like may be determined for a proposed division before the division orders are finalized.

The division order generation system 206 communicates with the data storage system 204, and once a user draws a proposed division order using the user map manipulation system 214, parameters such as the size of the proposed division order and ownerships interests in the proposed division can then be determined. The division order generation system 206 uses the boundaries of the proposed division order to determine what parcels, or portions of any parcels, fall within the proposed division order. The interests, associated parties, parcel information and other parameters related to the proposed division order are then sent to the data storage system 204, where they are loaded by the real time map generation system 212 and displayed to the user.

In some embodiments, the system 200 further has an editing system 210 and a quality control system 208. The editing system 210 may be an administration system permitting editing or management of data and documents stored in the data storage system 204. Thus, an administrator may enter the standard forms, clauses and agreement terms used through the research management system 216 for limiting the terms of negotiated contracts, leases and agreements.

The quality control system 208 may be a system that permits review of data and documents with a different level of access. For example, the quality control system 208 may permit users to review and annotate documents without modifying documents or allowing administrator access. Additionally, the quality control system 208 may implement the validation check on entered data.

The system 200 may be implemented in a virtualized environment, with multiple instances of the system running to permit multiple companies or accounts to maintain separate databases. Additionally, multiple levels of user access may be allowed within each system, with different user levels being granted access to different modules to different functions within modules. For example, field landmen may be granted access to enter data through the research management system 216 but not granted access to the lease management system 222 or division order management system 224.

Figure 3:
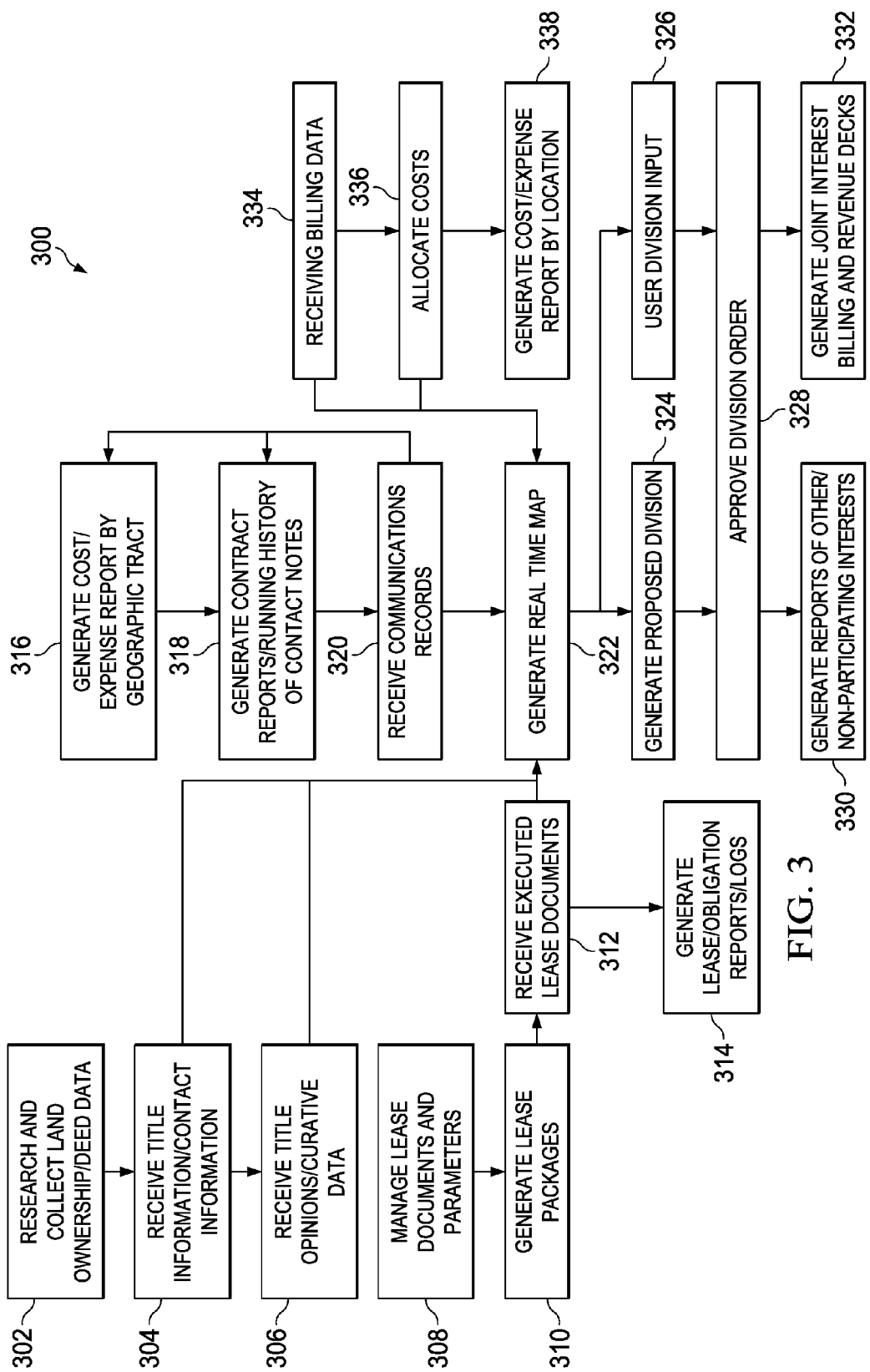
FIG. 3 is a flow diagram illustrating a method for collecting and managing rights information for use in the real time rights mapping system according to some embodiments.

FIG. 3 is a flow diagram illustrating a method 300 for collecting and managing rights information for use in the real time rights mapping system according to some embodiments. In block 302, land ownership or deed data is researched and collected. In some embodiments, the land ownership data is entered through the research management system or is gathered from public, private, or online sources. The land ownership data may include land surveys, tax records, parcel boundary information, ownership information or the like.

In block 304 the system receives title information and contact information. The rights holder or title holder for different parcels, and information for contacting the rights holding parties, is entered through the research management system. The title information may be reviewed and a title opinion and curative data received in block 306.

In block 320, communications records are received through, for example, the contact management system. The communications records, in some embodiments, describe terms of leases, contacts, or agreements being negotiated with rights holders. Contact reports or a running history of contact notes can be generated in block 318. Cost and expense reports can be generated by geographic tract in block 316.

Lease and contract documents or parameters are managed in block 308. In some embodiments, an administrator accesses the data storage system through the editing system to provide standard forms, preapproved contract clauses, standardized contract limits and terms, for use as the basis for the generated contracts, leases, and agreements. After a lease is negotiated, a user can request a lease package, and the lease package is generated in block 310. The executed lease documents are received in block 312 and entered into the data storage system. Lease and obligation reports or logs are generated in block 314 and describe the obligations created by the executed leases and contracts.

Billing data is received in block 334. In some embodiments, the billing data is entered into the billing management system. Costs described by the billing data are allocated in block 336. The costs may be allocated by tract or division to recovers the costs from payments to rights holders depending on the terms of the lease. Cost/expense reports are generated by location in block 338.

In block 322, the real time map is generated and displayed to a user. The real time map generation system retrieves map data that may include parcel information, rights holder information, the lease information, the cost information, and the like from the data storage system and displays the data in a unified map. Additionally, the display of the real time map is not limited to being performed after any particular step, as research and collection of land ownership and deed data, receiving billing data, receiving communications records, receiving executed lease documents receiving vendor data, or the like, can be performed at any time, with the real time map displaying an updated map based on the most recent data. Furthermore, such steps need not be performed in any particular order, since the system provides real time access to individual documents and data entries so that any entered data may be analyzed or operated on by system users.

A proposed division is generated in block 324. In some embodiments, the proposed division is automatically generated by analyzing the lease terms of parcels in an area, and defining a proposed division order that conforms to predefined parameters. For example, the system may automatically identify a division order including tracts with the lowest royalties, or creating the overall lowest royalty for the division. In other embodiments, a user may input a proposed division order in block 326. In block 328, the division order is approved after the proposed division is reviewed. Reports for other/nonparticipating interests may be generated in block 330. In block 332, joint interest billing and revenue decks are generated.

Figure 4:
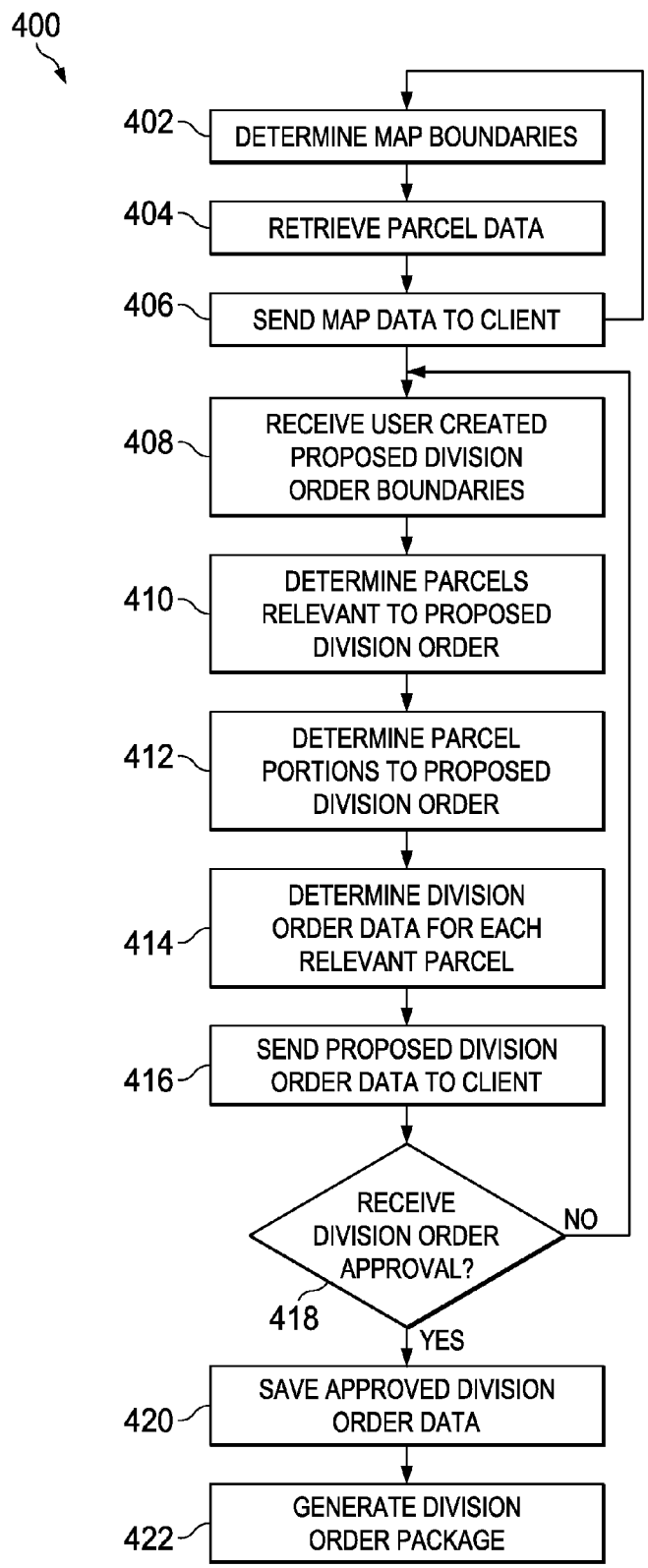
FIG. 4 is a flow diagram illustrating a method for displaying real time rights information according to some embodiments.

FIG. 4 is a flow diagram illustrating a method 400 for displaying real time rights information according to some embodiments. In block 402, the system determines the map boundaries. The map boundaries correspond to the borders of the interface display window, and the map boundaries are used to retrieve the relevant parcel data for display, as parcels that will not be displayed will not necessarily need to be sent to the user. In block 404, the deed or parcel data is retrieved from the data storage system. The deed or parcel data is retrieved according to the map boundaries. Map data, including the deed or parcel data, is send to the client application and displayed to the user. The process of determining the map boundaries, loading the deed or parcel data and sending the map data to the client application is repeated as the user manipulates the map, providing the user with a map reflecting the most recent deed or parcel data. In some embodiments, the map data is refreshed with the most recent deed or parcel data automatically, for example, according to a timer causing the client application to make an update request, or an automatic refresh of the data by the data storage system that is triggered by a change to the underlying data in the data storage system.

The system receives a user created proposed division order boundary in block 408. In some embodiments, the user drags a box, creates a polygon, or otherwise indicates a boundary of the proposed division order in the interface of the client application, and the client application sends the boundary data to the system. The boundary data is, for example, coordinates defining a closed region and is stored in the data storage system. In block 410, deeds or parcels relevant to the division order are determined. In some embodiments, the division order generation system determines any parcels falling within or overlapping the proposed division order boundaries. In block 412, parcel portions for the proposed division order are determined. The division order generation system determines whether each parcel overlapping the proposed division order falls completely within the proposed division order. For parcels that only partially overlap the proposed division order, the division order generation system determines what percentage, or what portions of the parcel, overlap the proposed division order, and uses that information to determine the decimal interest for the division order.

In block 414, the division order data for each relevant parcel is determined. In some embodiments, the division order generation system calculates the percentage of the division that each parcel represents, any overall royalties, obligations, or other parameters related to the division order and can be saved in the data storage system. In block 416, the proposed division order data is sent to the client application and displayed to the user. The system determines whether the proposed division order is approved in block 418. If the division order is not approved, the user has the opportunity to redraw the proposed division order, the process is repeated. If the division order is approved, the approved division order data is saved in the data storage system in block 420. A division order package is generated in block 422. The division order package may include individual division orders for each right holder and represent the saved division order and parcel and contact information from the data storage system.

Once the division order is approved and any relevant orders executed, an operator may then begin drilling or extracting minerals in the division defined by the division order. In such an instance, may drill within the boundaries defined by the approved division order, or drill according to the approved division order.

Figure 5:
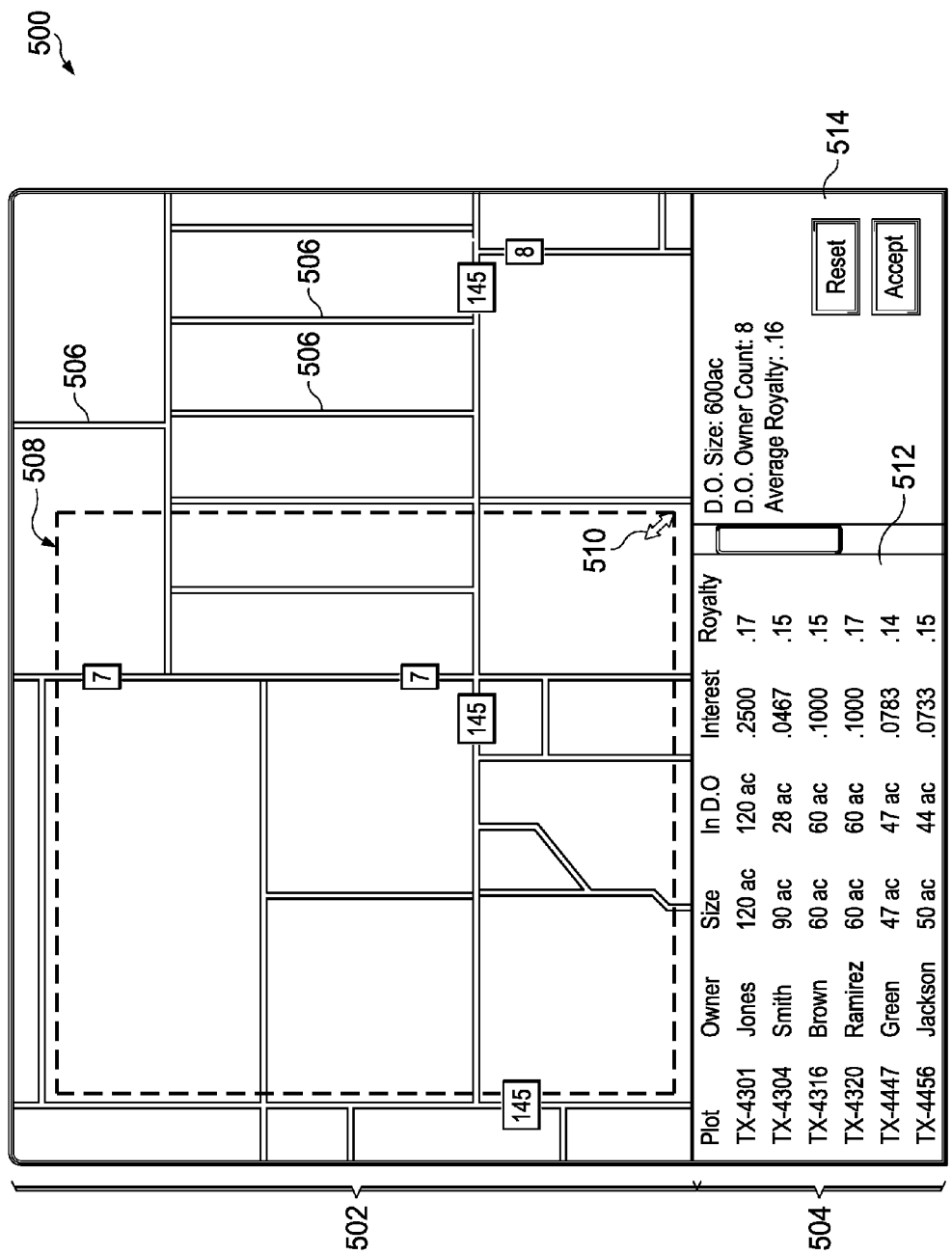
FIG. 5 is a diagram illustrating an interface displaying real time rights information according to some embodiments.

FIG. 5 is a diagram illustrating an interface 500 displaying real time rights information according to some embodiments. The interface has a map region 502 that graphically displays one of more parcel boundaries 506 overlaid over a geographic map. The interface 500 allows a user to define or manipulate a division order selection region 508 by, for example, using a mouse cursor 510 to drag the edges of a rectangle. In other embodiments, a user may define a division order using a polygon, circle or any other closed shape. In yet other embodiments, the division order selection region may be a fixed or predefined size to ensure that a division conforms to size rules of the state or field where the division will be located. In such embodiments, the user may drag the fixed sized division order selection region 508 across the map without changing its size.

The interface 500 may also have an information display region 504 with a parcel information region 512 and a division information region 514. Information related to each parcel falling within the division order selection region 508 may be displayed within the parcel information region and may include, for example, the rights holder name, size of the parcel, decimal interest for each parcel owner, royalty rate for each parcel owner, and the like. The information related to each parcel may be updated in real time so that the information is updated as the division order selection region 508 is dragged or adjusted by the user. Thus, a mouse movement while dragging may trigger a proposed division order submission to the server. The division information region 514 may display information related to the overall division, including size, number of parcels or rights holder within the division or the like.

Figure 6:
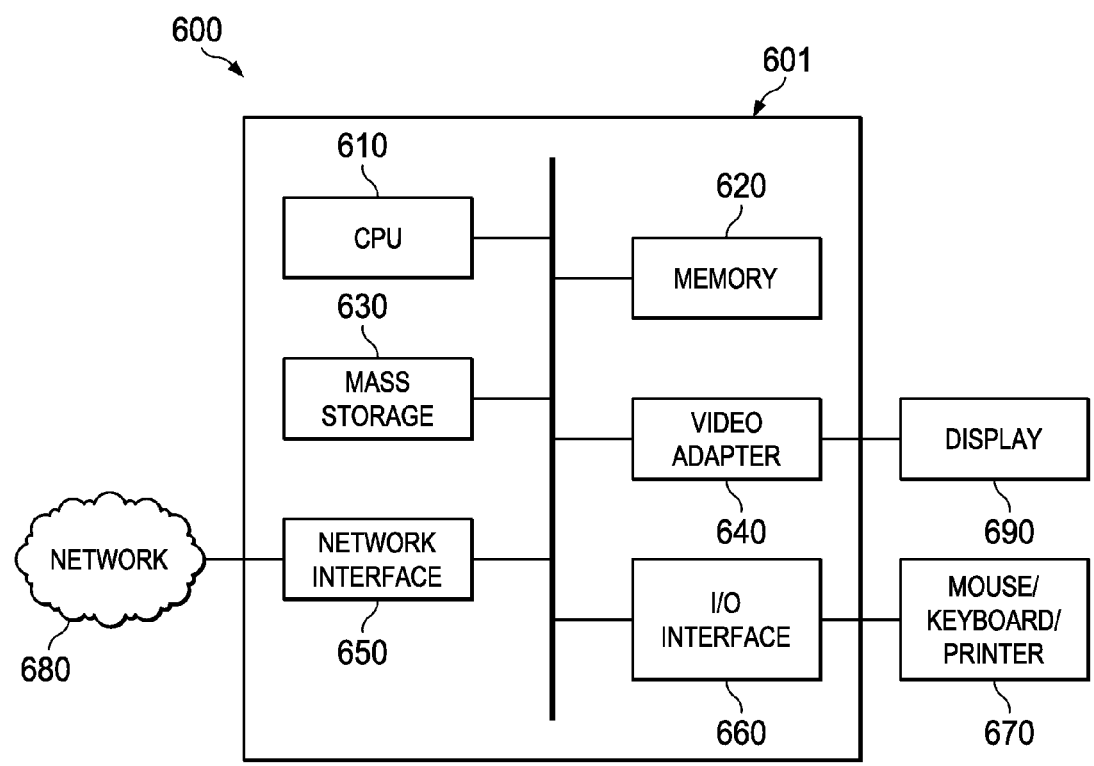
FIG. 6 is a diagram of a processing system that can be used to implement various embodiments.

FIG. 6 is a block diagram of a processing system 600 that can be used to implement various embodiments. The processing system 600 can be part of a server, remote computer or other computing device. Specific devices utilize all of the components shown, or only a subset of the components, and levels of integration will vary from device to device. Furthermore, a device may contain multiple instances of a component, such as multiple processing units, processors, memories, transmitters, receivers, etc. In some embodiments, the processing system 600 has a processing unit 601 equipped with one or more input/output devices, such as a speaker, microphone, mouse, touchscreen, keypad, keyboard, printer, display, and the like. The processing unit 601 may include a central processing unit (CPU) 610, a memory 620, a mass storage device 630, a video adapter 640, and an I/O interface 660 connected to a bus. The bus is one or more of any type of several bus architectures including a memory bus or memory controller, a peripheral bus, a video bus, or the like.

The CPU 610 may have any type of electronic data processor. The memory 620 may have, or be, any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory and may store software instructions for implementing the systems and methods disclosed herein. The mass storage device 630 includes any type of storage device that stores data, programs, and other information and to make the data, programs, and other information accessible via the bus. The mass storage device 630 includes, for example, one or more of a solid state drive, hard disk drive, a magnetic disk drive, an optical disk drive, or the like.

The video adapter 640 and the I/O interface 660 provide interfaces to couple external input and output devices to the processing unit. As illustrated, examples of input and output devices include a display 690 coupled to the video adapter 640 and any combination of mouse/keyboard/printer 670 coupled to the I/O interface 660. Other devices may be coupled to the processing unit 601, and additional or fewer interface cards may be utilized. For example, a serial interface card (not shown) may be used to provide a serial interface for a printer.

The processing unit 601 also includes one or more network interfaces 650, which includes wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

An embodiment system includes a network interface, a processor connected to the network interface and a non-transitory computer readable medium connected to the processor. The non-transitory computer readable medium has stored thereon instructions that, when executed, cause the processor to receive executed lease data for mineral rights leases on associated first land parcels, generate first map data according to the executed lease data, and send the first map data through the network interface to a client application for display to a first user at a first remote terminal. The non-transitory computer readable medium further has stored thereon instructions that cause the processor to receive, from the first remote terminal, data for a proposed division order boundary, determine one or more of the first land parcels having boundaries that at least partly overlap the proposed division order boundary, generate division order data related to portions of the one or more first land parcels, and send the division order data to the first remote terminal for display to the first user. In some embodiments, the non-transitory medium further has stored thereon instructions cause the processor to save the division order data in response to receiving a division order approval message from the first remote terminal, generate joint interest billing and revenue decks according to the saved division order data, or receive billing data from a third user at a third remote terminal and allocate costs from the billing data according to the saved division order data. In some embodiments, the non-transitory medium further has stored thereon instructions cause the processor to receive land ownership data from a second user at a second remote terminal and generate a set of lease documents according to the land ownership data. The land ownership data may include a title opinion. In some embodiments, the non-transitory medium further has stored thereon instructions cause the processor to generate second map data according to the executed lease data and in response to receiving a message from the first remote terminal that the user has changed a map display in the client application, and send the second map data through the network interface to the client application for updating the map display.

A method according to an embodiment includes receiving, at a service portal, executed lease data for mineral rights leases on associated first land parcels, generating first map data according to the executed lease data, and sending the first map data through a network interface to a client application for display to a first user at a first remote terminal. The method further includes receiving, from the first remote terminal, data for a proposed division order boundary, determining one or more of the first land parcels having boundaries that at least partly overlap the proposed division order boundary, generating division order data related to portions of the one or more first land parcels, and sending the division order data to the first remote terminal for display to the user. In some embodiments, the method further includes saving the division order data in response to receiving a division order approval message from the first remote terminal, or generating joint interest billing and revenue decks according to the saved division order data. The method may further include receiving billing data from a second user at a second remote terminal and allocating costs from the billing data according to the saved division order data, and the joint interest billing and revenue decks may be generated according to the saved division order data and the allocated costs. In some embodiments, the method further includes receiving land ownership data from a third user at a third remote terminal, and generating a set of lease documents according to the land ownership data, where the received executed lease data is associated with the land ownership data and the set of lease documents. In some embodiments, the method further includes receiving a communications record from a fourth user at a fourth remote terminal, where the generating the set of lease documents comprises generating the set of lease documents according to the land ownership data and the communications record. In some embodiments, the method further includes generating second map data according to the executed lease data and in response to receiving a message from the first remote terminal that the user has changed a map display in the client application, and sending the second map data through the network interface to the client application for updating the map display.

An embodiment method includes receiving, at a first remote terminal and from a server, first map data generated at the server according to executed lease data, displaying, in an interface on the first remote terminal, a map that includes parcel boundaries according to the first map data and that are overlaid on a geographic map, and receiving, at the first remote terminal, a first input from a user indicating a proposed division order boundary in the interface. The method further includes sending, from the first remote terminal to the server, data associated with the proposed division order boundary, receiving, at the first terminal and from the server, division order data associated with one or more land parcels having boundaries that at least partly overlap the proposed division order boundary, and displaying the division order data in the interface. In some embodiments, the map is displayed in real time, and the division order data comprises a list of owners of the one or more land parcels. In some embodiments, the method further includes receiving an input indicating approval of a division order associated with the proposed division order boundary and the division order data, and sending an approval message to the server in response to the receiving the input indicating the approval. The method may further include receiving an input indicating disapproval of a division order associated with the proposed division order boundary and the division order data, receiving, at the first remote terminal, a second input from the user indicating an adjusted proposed division order boundary in the interface, receiving, at the first terminal and from the server, adjusted division order data associated with one or more land parcels having boundaries that at least partly overlap the adjusted proposed division order boundary, and displaying the adjusted division order data in the interface.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:
a network interface;
a processor connected to the network interface; and
a non-transitory computer readable medium connected to the processor and having stored thereon instructions that, when executed, cause the processor to:
receive executed lease data for mineral rights leases on associated first land parcels from at least one second remote terminal;
generate first map data according to the executed lease data;
send the first map data through the network interface to a client application being executed on a first remote terminal for display to a first user at the first remote terminal, wherein the first map data comprises lease information for respective leases on the first land parcels, and wherein sending the first map data causes the client application to provide a user interface displaying, in a first display region, a map of land features according to the lease information for the first land parcels, and further displaying, in one or more second display regions and with the map displayed in the first display region, lease information and division order information, wherein the client application permits the user to create, in the first display region of the user interface, a proposed division order boundary over the map according to at least the lease information and wherein the proposed division order boundary defines a new boundary for a proposed division and comprises a closed shape, the proposed division associated with a proposed mineral extraction well associated with the first land parcels;
receive, from the first remote terminal, data for the proposed division order boundary submitted by the first user through the first remote terminal;
determine, according to the proposed division order boundary, one or more second land parcels from among the first land parcels, the second land parcels having boundaries that are within, or at least partly overlap, the proposed division order boundary;
generate, automatically, and in response to determining the one or more second land parcels, second map data comprising division order data associated with the one or more second land parcels and further associated with the lease information associated with the one or more second land parcels;
send the second map data and the division order data to the first remote terminal for display to the first user in the user interface;
receive, from the first remote terminal, data for an adjusted division order boundary that is an adjusted boundary submitted by the first user for the proposed division order boundary;
determine, according to the adjusted division order boundary, one or more third land parcels from among the first land parcels that have boundaries that are within, or at least partly overlap, the adjusted division order boundary
generate, automatically and in response to determining the one or more third land parcels, third map data comprising updated division order data associated with the one or more third land parcels and further associated with the lease information associated with the one or more third land parcels; and
send the third map data and the updated division order data to the first remote terminal for display to the first user in the user interface.

2. The system according to claim 1, the non-transitory medium further having stored thereon instructions that, when executed, cause the processor to:
save the division order data in response to receiving a division order approval message from the first remote terminal.

3. The system according to claim 2, the non-transitory medium further having stored thereon instructions that, when executed, cause the processor to:
generate joint interest billing and revenue decks according to the saved division order data.

4. The system according to claim 2, the non-transitory medium further having stored thereon instructions that, when executed, cause the processor to:
receive billing data from a second user at a third remote terminal; and
allocate costs from the billing data according to the saved division order data.

5. The system according to claim 1, the non-transitory medium further having stored thereon instructions that, when executed, cause the processor to:
receive land ownership data from a third user at a fourth remote terminal; and
generate a set of lease documents according to the land ownership data.

6. The system according to claim 5, wherein the land ownership data includes a title opinion.

7. The system according to claim 1, the non-transitory medium further having stored thereon instructions that, when executed, cause the processor to:
generate the second map data in response to receiving a message from the first remote terminal that the user has changed a map display in the client application.

8. A method, comprising:
receiving, at a service portal, executed lease data for mineral rights leases on associated first land parcels from at least one second remote terminal;
generating first map data according to the executed lease data;
sending the first map data through a network interface to a client application being executed on a first remote terminal for display to a first user at the first remote terminal, wherein the sending the first map data causes the client application to provide a user interface displaying, in a first display region, a map of land features, and further displaying, in one or more second display regions and with the map displayed in the first display region, lease information and division order information, wherein the client application permits the user to create, in the first display region of the user interface, a proposed division order boundary that comprises a closed shape and that defines a new boundary for a proposed division associated with a proposed mineral extraction well associated with the first land parcels;
receiving, from the first remote terminal, data for the proposed division order boundary submitted by the first user through the first remote terminal;
determining, according to the proposed division order boundary, one or more second land parcels from among the first land parcels, the second land parcels having boundaries that are within, or at least at least partly overlap, the proposed division order boundary;

generating, automatically, and in response to determining the one or more second land parcels, second map data comprising division order data associated with the one or more second land parcels, and further associated with the lease information associated with the one or more second land parcels;

sending the second map data and the division order data to the first remote terminal, the sending the second map data and division order data causing the client application to display the division order data and to update a display of data associated with lease data for the second land parcels;

receiving, from the first remote terminal, data for an adjusted division order boundary that is an adjusted boundary submitted by the first user for the proposed division order boundary;

determining, according to the adjusted division order boundary, one or more third land parcels from among the first land parcels that have boundaries that are within, or at least partly overlap, the adjusted division order boundary generating, automatically and in response to determining the one or more third land parcels, third map data comprising updated division order data associated with the one or more third land parcels and further associated with the lease information associated with the one or more third land parcels; and sending the third map data and the updated division order data to the first remote terminal for display to the first user in the user interface.

9. The method according to claim 8, further comprising saving the division order data in response to receiving a division order approval message from the first remote terminal.

10. The method according to claim 9, further comprising generating joint interest billing and revenue decks according to the saved division order data.

11. The method according to claim 10, further comprising:
receiving billing data from a second user at a third remote terminal; and
allocating costs from the billing data according to the saved division order data.

12. The method according to claim 11, wherein the joint interest billing and revenue decks are generated according to the saved division order data and the allocated costs.

13. The method according to claim 8, further comprising:
receiving land ownership data from a third user at a third remote terminal; and
generating a set of lease documents according to the land ownership data;
wherein the received executed lease data is associated with the land ownership data and the set of lease documents.

14. The method according to claim 13, further comprising:
receiving a communications record from a fourth user at a fourth remote terminal;
wherein the generating the set of lease documents comprises generating the set of lease documents according to the land ownership data and the communications record.

15. The method according to claim 8, further comprising:
generating the second map data according to the executed lease data and in response to receiving a message from the first remote terminal that the user has changed a map display in the client application.

16. A method, comprising:
receiving, at a first remote terminal and from a server, first map data generated at the server according to executed lease data generated at a second remote terminal and sent to the server, wherein the first map data comprises cost information associated with royalty rates for respective leases on first land parcels;

displaying, in a first display region of a user interface of a client application being executed on the first remote terminal, a map of land features according to lease data of the first map data, the map further displaying parcel boundaries of the land parcels according to the first map data and that are overlaid on the map, and further displaying, in one or more second display regions of the user interface and with the map displayed in the first display region, the lease data and division order information, the interface permitting a user to create, in the first display region of the user interface, a proposed division order boundary in the interface over the map displayed in the first display region and according to at least the royalty rates, wherein the division order boundary defines a new boundary for a proposed division and comprises a closed shape, the proposed division associated with a proposed mineral extraction well associated with the first land parcels;

receiving, at the first remote terminal, a first input from the user indicating the proposed division order boundary in the interface;

sending, from the first remote terminal to the server, data associated with the proposed division order boundary submitted by the user through the first remote terminal;

receiving, at the first remote terminal and from the server, second map data comprising division order data associated with one or more second land parcels from among the first land parcels and having boundaries that are within, or at least partly overlap the proposed division order boundary, the one or more second land parcels determined from among the first land parcels by the server according to the proposed division order boundary, the second map data generated automatically by the server and in response to the server determining the one or more second land parcels, the second map data comprising division order data associated with the one or more second land parcels and further associated with the lease data associated with the one or more second land parcels;

displaying the map in the first display region according to lease data of the second map data, and further displaying, in the one or more second display regions of the user interface and with the map displayed in the first display region, the lease data and division order data associated with the one or more second land parcels;

receiving, at the first remote terminal, a second input from the user indicating an adjusted division order boundary that is an adjusted boundary for the proposed division order boundary;

sending, from the first remote terminal to the server, data for the adjusted division order boundary;

receiving, at the first remote terminal and from the server, third map data comprising division order data associated with one or more third land parcels having boundaries that are within, or at least partly overlap the adjusted division order boundary, the one or more third land parcels determined from among the first land parcels by the server according to the adjusted division order boundary, the third map data generated automatically by the server and in response to the server determining the one or more third land parcels, the third map data comprising division order data associated with the one or more third land parcels and further associated with the lease data associated with the one or more third land parcels;

displaying the map in the first display region according to lease data of the third map data, and further displaying, in the one or more second display regions of the user interface and with the map displayed in the first display region, the lease data and division order data associated with the one or more third land parcels.

17. The method according to claim 16, wherein the map is displayed in real time.

18. The method according to claim 16, wherein the division order data comprises a list of owners of the one or more land parcels.

19. The method according to claim 16, further comprising:

receiving an input indicating approval of a division order associated with the proposed division order boundary and the division order data; and sending an approval message to the server in response to the receiving the input indicating the approval.

20. The method according to claim 16, further comprising:

receiving an input indicating disapproval of a division order associated with the proposed division order boundary and the division order data; and receiving, at the first remote terminal, the second input from the user indicating the adjusted proposed division order boundary in the interface in response to receiving an input indicating disapproval of a division order.

* * * * *